United States Patent [19]

Aalto et al.

[11] Patent Number: 4,627,498
[45] Date of Patent: Dec. 9, 1986

[54] FUSE DESIGN FOR FIRE LIMITERS OR OTHER SAFETY APPLIANCES IN VENTILATION INSTALLATIONS

[75] Inventors: Erkki Aalto, Kausala; Harri Saukkonen, Kouvola; Juhani Häsä, Kausala, all of Finland

[73] Assignee: Halton Oy, Finland

[21] Appl. No.: 629,831

[22] PCT Filed: Nov. 11, 1983

[86] PCT No.: PCT/FI83/00069

§ 371 Date: Jul. 6, 1984

§ 102(e) Date: Jul. 6, 1984

[87] PCT Pub. No.: WO84/01906

PCT Pub. Date: May 24, 1984

[30] Foreign Application Priority Data

Nov. 12, 1982 [FI] Finland .................................. 823899

[51] Int. Cl.⁴ ............................................. E05F 1/00
[52] U.S. Cl. ............................................. 169/42; 49/7; 126/287.5; 137/72
[58] Field of Search ............... 169/42, 57, 58, DIG. 3, 169/54, 56; 49/1, 7; 52/232; 126/287.5; 98/86; 122/504.3, 504.1; 222/54; 137/72-77; 411/82, 171, 257, 258

[56] References Cited

U.S. PATENT DOCUMENTS

| | | | |
|---|---|---|---|
| 1,924,869 | 8/1933 | Lovekin et al. | 137/72 |
| 2,523,029 | 9/1950 | Kramer | 169/42 |
| 2,635,718 | 4/1953 | Birkemeier | 169/42 X |
| 2,764,025 | 9/1956 | Otto | 49/7 |
| 3,283,691 | 11/1966 | Reiter | 98/86 |
| 3,543,439 | 10/1968 | Pantland | 49/7 |
| 3,896,835 | 7/1975 | Wicke | 137/75 |
| 4,221,231 | 9/1980 | Harvey et al. | 137/72 |
| 4,366,830 | 1/1983 | Becelaere | 49/1 |

FOREIGN PATENT DOCUMENTS

| | | | |
|---|---|---|---|
| 613415 | 1/1961 | Canada | 411/258 |
| 2261153 | 7/1974 | Fed. Rep. of Germany . | |
| 148700 | 8/1983 | Norway . | |
| 153122 | 11/1920 | United Kingdom | 122/504.3 |

Primary Examiner—Andres Kashnikow
Attorney, Agent, or Firm—Steinberg & Raskin

[57] ABSTRACT

A fuse for safety appliances such as fire limiters in ventilation systems, the fuse comprising a first part, a second part, fusible material disposed between said first and second parts for normally maintaining said parts in fixed position with respect to one another when the fusible material is in solid form, a narrow path being defined for flow of fusible material in molten form, and the first and second parts being urged towards one another. The parts move towards one another when the fusible material melts and flows through the narrow path. The parts stop moving when the fusible material stops flowing with the parts again maintained in fixed position with respect to one another when the fusible material resolidifies.

11 Claims, 6 Drawing Figures

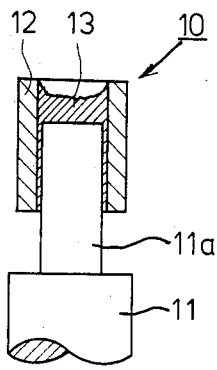
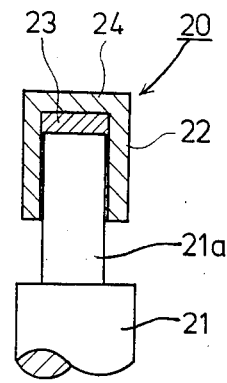
FIG.1    FIG.2
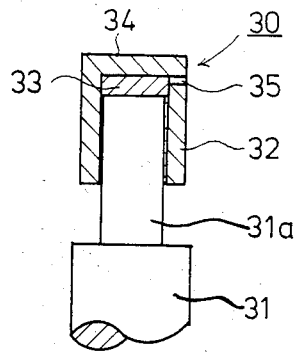
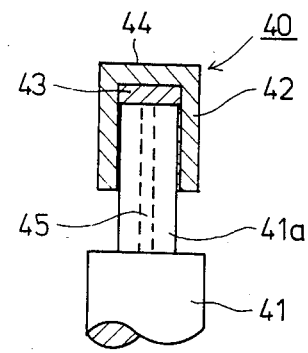
FIG.3    FIG.4
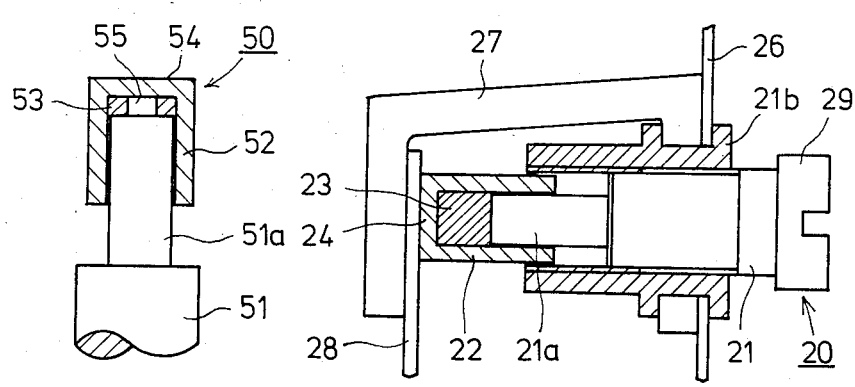
FIG.5    FIG.6

FUSE DESIGN FOR FIRE LIMITERS OR OTHER SAFETY APPLIANCES IN VENTILATION INSTALLATIONS

BACKGROUND OF THE INVENTION

The present invention concerns a fuse design for tripping fire limiters or other safety appliances in ventilation installations, comprising a fuse body part and a fuse material, the fuse material being disposed, when in solid state, to maintain the parts of the fuse in a certain position relative to each other and when in liquid state, to permit the parts of the fuse to move with reference to each other.

It would be highly welcome in fire limiters if one fuse could be used more often than just once. It would be of importance that subsequent to false or test tripping for reasons other than fire, which occurs frequently in the case of fire limiters, the same fuse could be immediately used for resetting. It is also important that the operability of a fire limiter could be checked in a simple and convenient manner regarding the structure other than the fuse, by tripping and resetting the closing member, e.g. the flap or louvre pack, once or several times. Convenient detachability and replaceability of the fuse are also advantages.

SUMMARY OF THE INVENTION

The currently most well known and most used design is a strip fuse, in this structure two metal strips being soldered together with the aid of fuse material having desired melting point. When the temperature of the fuse material rises to a pre-determined limit value, that is to the melting temperature, the strips become detached from each other. A drawback of a structure of this kind is however that the same fuse cannot be reused after false or test tripping. A strip fuse is also quite likely to suffer damage or to break. There is also the problem of the long-term strength of the fuse material and the difficult control of the soldering process.

Another fuse design known in the art is the so-called glass ball fuse in which between two latches are placed a glass ball filled with a liquid with powerful thermal expansion, and which breaks when the liquid expands. The set-up of the latches relative to each other is such that when the glass ball bursts as the temperature reaches its given limit value they get free from each other. A drawback of this design is its single-use, expensive and inconvenient construction.

At present, reuse of the fuses proper is not possible, although it is true that triggers based on thermal expansion are known in the art, for instance a tripping mechanism wherein a stack assembled of bimetal strips expands as it is heated and detaches a pin, connected to the structure, from a locking hole, whereby tripping can take place. A drawback of the structure has been found to be that the bimetal strips react slowly to temperature increase, and moreover the design is expensive; it is rather susceptible to interference, easily damaged, sensitive to corrosion, and in case of fault awkward to repair.

The object of the present invention is to provide an improvement in fuse designs known in the art. A more detailed object of the invention is to provide a fuse design based on the melting of a substance and which is durable, reliable in operation, resistant to corrosion, easy to test, favourable as to its manufacturing cost, easy to detach or replace, and which permits repeated use of the fuse.

In the German publicizing print No. 2 261 153 is disclosed a fuse design in which the fuse plate is subject to pressure. After the fuse material has melted, the molten substance flows off in uncontrolled manner, and therefore reuse is not possible as a rule. In addition, the design requires an ample amount of fuse material. The softening of the fuse material at temperature below the melting point may also cause failure of the locking in this type of fuse because in it a harmful creep is possible, which is a phenomenon typical of fuse materials.

The objects of the invention are attained with the aid of a fuse design which is mainly characterized in that the fuse material has been arranged in molten state to flow through a narrow flow path arranged in the fuse design under action of the internal pressure caused in the fuse material by the locking forces acting on the fuse, for tripping the fire limiter or other safety appliance.

The fuse design according to an advantageous embodiment of the invention is characterized in that after the internal pressure caused in the fuse material by the locking force has dropped below the flowing limit, the flow of the fuse material ceases and the parts of the fuse cease to move relative to each other, and that falling of the temperature below the solidifying limit causes the fuse material to solidify so that the parts of the fuse will remain in this new position, thus enabling the fire limiter or other safety appliance to be reset with the aid of the same fuse one or more times.

By the fuse design of the invention, numerous significant advantages are gained, such as good durability, reliability in operation, resistance to corrosion, favourable production costs, convenient testing, convenient detachability, and replaceability. In the choice of material no attention need be paid to solderability either. In addition, no undue problems are caused by the tripping of these fire limiters due to faults or for testing, since they are so easy to reset.

BRIEF DESCRIPTION OF THE DRAWINGS

The invention is described in detail referring to certain advantageous embodiments of the invention presented in the figures of the drawing attached, but to which the invention is not meant to be exclusively confined.

FIG. 1 presents an advantageous embodiment of the fuse design of the invention in a schematic cross-section.

FIG. 2 presents another advantageous embodiment of the fuse design of the invention in a schematic cross-section.

FIG. 3 presents a third advantageous embodiment of the fuse design of the invention in a schematic cross-section.

FIG. 4 presents a fourth advantageous embodiment of the fuse design of the invention in a schematic cross-section.

FIG. 5 presents a fifth advantageous embodiment of the fuse design of the invention in a schematic cross-section.

FIG. 6 presents a fuse design as in FIG. 2, installed on a fire damper, in a schematic cross-section.

DETAILED DESCRIPTION OF THE PREFERRED EMBODIMENTS

The fuse design depicted in FIG. 1 has been generally indicated by the reference numeral 10. The fuse 10 comprises a body part 11, in the present embodiment provided with a thinner tip portion 11a. On the end of the tip portion 11a of the body part 11 is disposed a sleeve-like member 12, and between the tip part 11a and the sleeve-like member 12 is placed the fuse material 13 which keeps the sleeve-like member 12 at a certain preselected axial distance with reference to the body part 11 when the body part 11 and the sleeve-like member 12 tend under influence of external force to move further into each other. In this embodiment, the sleeve-like member 12 is open at both ends. It is thus understood that the sleeve-like member 12 is joined by the fuse material 13 to the tip portion 11a of the body part 11. When the temperature rises, the fuse material 13 becomes liquid, and under effect of the axial force the sleeve-like member 12 is enabled to move in the direction of the body part 11.

The fuse design presented in the embodiment of FIG. 2 is generally indicated by the reference numeral 20. In this embodiment, a sleeve-like member 22 provided with a bottom 24 is disposed around the tip portion 21a of the body part 21, and between the tip portion 21a and the sleeve-like member 22 is placed the fuse material 23, of which the viscosity in the course of temperature increase changes drastically at the melting point and owing to the axial force fuse material 23 is enabled to flow into the free space between the tip portion 21a and the sleeve-like member 22, whereby the sleeve-like member 22 is enabled to move in the direction of the body part 21. It is to be particularly noted that at normal temperature the fluidity of the fuse material is virtually nil, because of which no flowing of the fuse material will take place even at extreme pressures, provided that clearance between the tip portion 21a and the sleeve-like member 22 is appropriate in magnitude.

The fuse design presented in FIG. 3 is generally indicated by the reference numeral 30. In this embodiment, too, about the tip portion 31a of the body part 31 has been disposed a sleeve-like member 32 having a bottom 34.

The fuse material 33 is disposed between the tip portion 31a and the sleeve-like member 32. In this embodiment, the sleeve-like member 32 is provided with a hole or passage 35, through which the controlled flow of the fuse material will take place.

Also in the embodiment of FIG. 4, there has been placed a sleeve-like member 42 with bottom 44 around the tip portion 41a of the body part 41 of the fuse design, generally indicated by the reference numeral 40, and the fuse material 43 is disposed between the tip portion 41a and the sleeve-like member 42. The principle of operation of the permanent fuse 40 is the same as that of the permanent fuse 30 shown in FIG. 3, with the difference that in the embodiment of FIG. 4 the passage or hole 45 has been made in the tip portion 41a of the body part 41. Consequently, in this embodiment the liquid fuse material has been arranged to flow into a passage or hole 45 in the tip portion 41a.

The fuse design presented in FIG. 5 is generally indicated by the reference numeral 50. In this embodiment, too, on the tip portion 51a of the body part 51 is disposed a sleeve-like member 52 provided with bottom 54. A button of fuse material is placed between the tip portion 51a and the sleeve-like member 52. In this embodiment, the fuse material 53 is an annular fuse material button provided with an aperture 55, that is, the fuse material button 53 itself has a hole or passage 55, into which the liquid fuse material has been arranged to move.

The operation of the fuse design 10,20,30,40 or 50 of the invention is as follows. When the fuse design 10 is connected to a fire limiter, a compressive force acts on the fuse material 13,23,33,43,53 over the body part 11,21,31,41,51 and the sleeve-like member 12,22,32,42,52, whereby the movement of the sleeve-like member and of the body part 11,21,31,41,51 of the fuse with reference to each other is prevented while the fuse material is in solid state. When the temperature rises to the melting temperature of the fuse material 13,23,33,43,53, the fluidity of the fuse material begins to become considerably mobile and the sleeve-like member will under influence of the force acting on the sleeve-like member be displaced with reference to the body part, whereby the fire limiter is tripped.

In FIG. 6 is presented an advantageous practical application of the fuse design of the invention. In this embodiment, the fuse 20 of FIG. 2 has been installed on a fire damper, the shell of which has been indicated by the reference numeral 26. To the shell 26 is attached a shaped counterpiece 27 and a clamping arc 28 attached to the closing plate of the fire damper (not depicted) is clamped by the aid of the fuse and the counterpiece 27 in the way that in the present embodiment the clamping arc 28 is impacted between the bottom 24 of the sleeve-like member 22 of the fuse and the counterpiece 27. The clamping may also be accomplished without counterpiece 27, in which case the sleeve-like part 22 directly clamps the clamping arc 28. The other end of the body part 21, threaded over a certain length, of the fuse 20 has been shaped as a screw head 29, whereby it is simple to accomplish positive clamping of the clamping arc 28 by turning the body part 21. The body part 21 is encircled by a body part 21b provided with threads and attached to the shell 26.

When the temperature is low enough, the closing member can be set with the aid of the fuse. The action of the fuse is based on changing viscosity of the fuse material and/or its ability to reattach when the temperature has gone down. The body parts 21 and 21b are so dimensioned that setting of the fire limiter cannot be accomplished without fuse material.

The fuse can be used until the fuse material has run short in the space between the body part and the sleeve-like member, or until the empty space 55 shown in FIG. 5 has been filled. Thereafter, a new fuse material button can be inserted in the fuse or the entire fuse may be replaced. By means of the fuse material quantity, the number of times one fuse can be used may be regulated.

We claim:
1. A fuse arrangement, comprising
a first part,
a second part,
said first part being constituted by a sleeve-like member disposed about said second part, and
fusible material disposed between said first and second parts and normally maintaining said parts in fixed position with respect to one another when said fusible material is in solid form,
a narrow path being defined in one of said first part, said second part, between said parts, or in said fusible material itself, for flow of said fusible material in molten form, and
mens for urging said first and second parts towards one another, said urging means comprising a fire damper comprising an outer shell, said second part being secured into said outer shell, and a clamping arc abutting against said first sleeve-like member, whereby said parts are caused to move towards one another by said urging means when said fusible material melts and flows through said narrow path, said parts stop moving when said fusible material stops flowing, and said parts are again maintained in a new fixed position with respect to one another when said fusible material resolidifies and said fire damper being re-clamped by tightening said second part in said shell after said fusible material has resolidified.

2. The arrangement of claim 1, wherein said second part comprises a tip member extending into said sleeve-like member constituting said first part, and said narrow path being defined between said sleeve-like member and said tip member.

3. The arrangement of claim 1, wherein said sleeve-member is open at both ends.

4. The arrangement of claim 1, wherein said sleeve-like member is closed at one end and said sleeve-member is further provided with a channel therethrough constituting said narrow path.

5. The arrangement of claim 1, wherein said sleeve-like member is closed at one end and said narrow path is disposed through said second part.

6. The arrangement of claim 1, wherein said narrow path is disposed as an aperture within said fusible material.

7. The arrangement of claim 1, wherein said second part is threaded and screwed into said outer shell.

8. The arrangement of claim 1, additionally comprising a counterpiece attached to said shell and said clamping arc at opposite ends thereof.

9. The arrangement of claim 9, wherein after depletion of said fusible material, said counterpiece and said clamping arc are situated such that said fire damper cannot be reclamped by tightening said second part.

10. A fuse, comprising a first part, a second part, fusible material disposed between said first and second parts and normally maintaining said parts in fixed position with respect to one another when said fusible material is in solid form, a narrow path being defined for flow of said fusible material in molten form, and means for urging said first and second parts towards each other, wherein said first part is constituted by a sleeve-like member disposed about said second part, said sleeve-like member being closed at one end and said narrow path being disposed through said second part, whereby said parts move towards one another when said fusible material melts and flows through said narrow path, said parts stop moving when said fusible material stops flowing, and said parts are again maintained in fixed position with respect to one another when said fusible material resolidifies.

11. A fuse, comprising a first part, a second part, fusible material disposed between said first and second parts and normally maintaining said parts in fixed position with respect to one another when said fusible material is in solid form, a narrow path being defined for flow of said fusible material in molten form, and means for urging said first and second parts towards each other, wherein said first part is constituted by a sleeve-like member disposed about said second part and said narrow path being disposed as an aperture within said fusible material, whereby said parts move towards one another when said fusible material melts and flows through said narrow path, said parts stop moving when said fusible material stops flowing, and said parts are again maintained in fixed position with respect to one another when said fusible material resolidifies.

* * * * *